US007987766B1

(12) United States Patent
Price

(10) Patent No.: US 7,987,766 B1
(45) Date of Patent: Aug. 2, 2011

(54) HYDRAULIC CYLINDER APPARATUS

(76) Inventor: Robert Sterling Price, Lowry City, MO (US)

( * ) Notice: Subject to any disclaimer, the term of this patent is extended or adjusted under 35 U.S.C. 154(b) by 381 days.

(21) Appl. No.: 12/132,424

(22) Filed: Jun. 3, 2008

(51) Int. Cl.
*F16J 1/00* (2006.01)
(52) U.S. Cl. .......................................................... 92/177
(58) Field of Classification Search ..................... 92/177
See application file for complete search history.

(56) References Cited

U.S. PATENT DOCUMENTS 3,705,685 A 12/1972 Brewer et al.
4,114,517 A * 9/1978 Teramachi ...................... 92/177
4,535,873 A * 8/1985 Airheart .......................... 92/177
D286,780 S 11/1986 Collyear et al.
4,662,177 A 5/1987 David
4,689,957 A 9/1987 Gallentine
D371,562 S 7/1996 Rushfeldt
5,653,676 A 8/1997 Buck et al.
6,533,085 B2 3/2003 Moradmand et al.
2005/0025648 A1* 2/2005 Shimizu et al. ............... 417/521

* cited by examiner

*Primary Examiner* — F. Daniel Lopez
(74) *Attorney, Agent, or Firm* — Crossley Patent Law; Mark A. Crossley

(57) ABSTRACT

The hydraulic cylinder apparatus has a crescent shaped length housing a piston of like shape. The crescent shape provides for fit into constrained spaces where a fully cylindrical cylinder cannot fit. Multiple crescent shaped case ring lands with case rings seal the length of the piston proximal to the top of the case. The plurality of piston ring lands and piston rings seal the sliding piston to the walls of the case's internal hydraulic fluid well. The numerous ports of the apparatus, both upper and lower, provide for more convenient application than would otherwise be provided. Hose routing can thereby be best suited to a particular application. An added advantage of the apparatus is the negation of piston and mount rotation, a feature not typically possible with cylindrical hydraulic cylinders.

4 Claims, 4 Drawing Sheets

HYDRAULIC CYLINDER APPARATUS

BACKGROUND OF THE INVENTION

Hydraulic cylinders are used in a myriad of applications. Typical hydraulic cylinders are cylindrical in shape and can be used to apply force or to dampen force. Placement of a hydraulic cylinder is often key to function. The cylindrical shape of typical hydraulic cylinders can often be problematic in that such shape prohibits ideal placement of the cylinder for the task to be performed. And, too, added space must often be engineered into a project because of a cylindrical shaped cylinder. Service and replacement of cylindrical hydraulics can also be problematic due to crowded arrangements of the cylinders and other components. Additionally, the leverage applied by a cylinder can be less than ideal due to placement, because of cylindrical shape that hinders best leverage positioning. What is needed is a hydraulic cylinder apparatus which departs from conventional round shape in order that the apparatus can be ideally positioned and contribute to space saving. The present apparatus fulfills this need.

FIELD OF THE INVENTION

The hydraulic cylinder apparatus relates to hydraulic cylinders and more especially to a crescent-shaped hydraulic cylinder.

SUMMARY OF THE INVENTION

The general purpose of the hydraulic cylinder apparatus, described subsequently in greater detail, is to provide a hydraulic cylinder apparatus which has many novel features that result in an improved hydraulic cylinder apparatus which is not anticipated, rendered obvious, suggested, or even implied by prior art, either alone or in combination thereof.

To attain this, the hydraulic cylinder apparatus comprises a case with a crescent shaped length housing a piston of like shape. The crescent shape provides for fit into constrained spaces where a fully cylindrical cylinder cannot fit. Ideally, multiple crescent shaped case ring grooves with case rings seal the length of the piston proximal to the top of the case. The plurality of piston ring grooves and piston rings seal the sliding piston to the walls of the case's internal hydraulic fluid well. The numerous ports of the apparatus, both upper and lower, provide for more convenient application than would otherwise be provided. By featuring numerous ports, hydraulics can be connected to the apparatus at the best suited locations on the case. Hose routing can thereby be best suited to a particular application. An added advantage of the apparatus is the negation of piston and mount rotation, a feature not typically possible with cylindrical hydraulic cylinders.

Thus has been broadly outlined the more important features of the improved hydraulic cylinder apparatus so that the detailed description thereof that follows may be better understood and in order that the present contribution to the art may be better appreciated.

An object of the hydraulic cylinder apparatus is to provide a hydraulic cylinder of diminished thickness.

A further object of the hydraulic cylinder apparatus is to provide for fit into limited spaces.

Another object of the hydraulic cylinder apparatus is to provide highly effective seals for the piston and case.

An added object of the hydraulic cylinder apparatus is to provide for long service life.

And, an object of the hydraulic cylinder apparatus is to provide numerous hydraulic ports.

These together with additional objects, features and advantages of the improved hydraulic cylinder apparatus will be readily apparent to those of ordinary skill in the art upon reading the following detailed description of presently preferred, but nonetheless illustrative, embodiments of the improved hydraulic cylinder apparatus when taken in conjunction with the accompanying drawings.

In this respect, before explaining the current embodiments of the improved hydraulic cylinder apparatus in detail, it is to be understood that the hydraulic cylinder apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved hydraulic cylinder apparatus. It is therefore important that the claims be regarded as including such equivalent constructions insofar as they do not depart from the spirit and scope of the hydraulic cylinder apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the hydraulic cylinder apparatus generally designated by the reference number 10 will be described.

Figure 1:
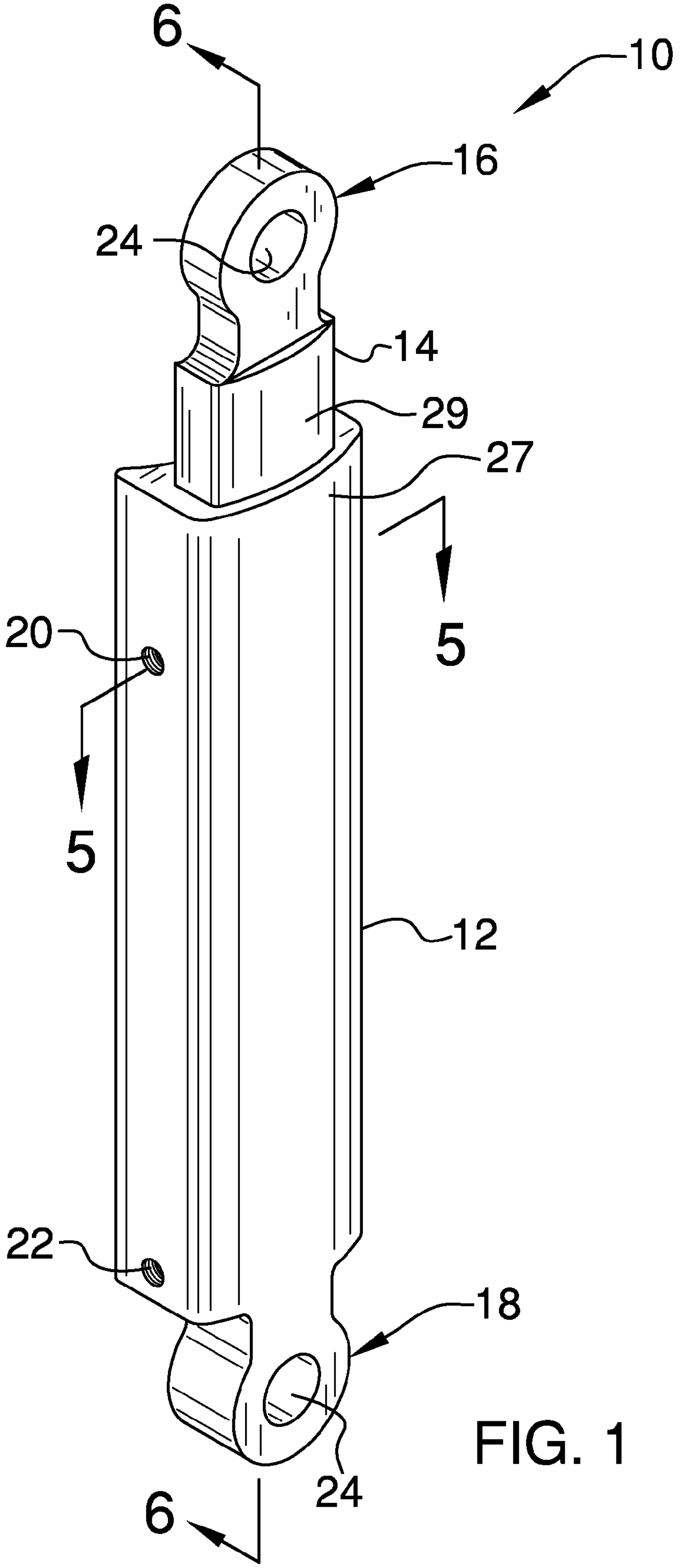
FIG. 1 is a perspective view.
Figure 2:
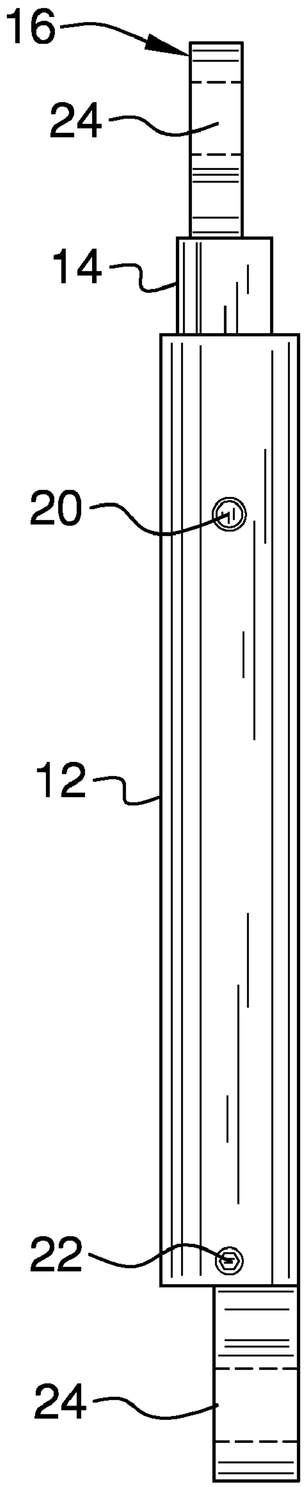
FIG. 2 is a lateral elevation view.
Figure 3:
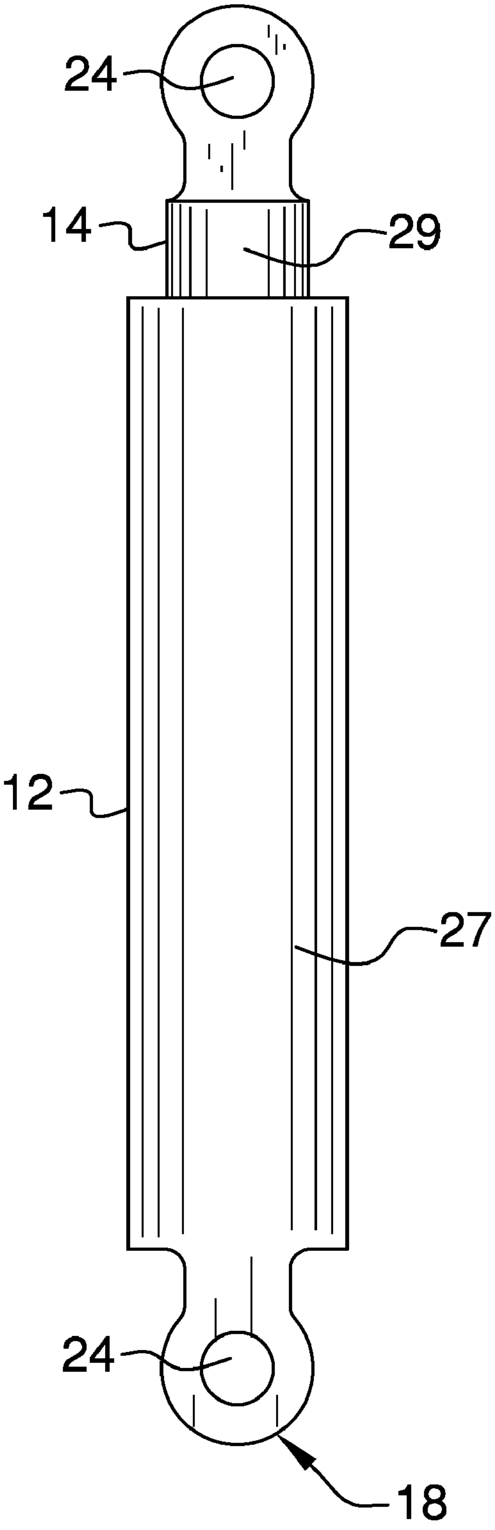
FIG. 3 is a front elevation view.

Referring to FIGS. 1-3, the hydraulic cylinder apparatus 10 is comprised of a crescent shaped piston 14 fitted within a crescent shaped case 12. The top of the piston 14 further comprises a $1^{st}$ mount 16. The bottom of the case 12 further comprises a $2^{nd}$ mount 18. Various embodiments of the apparatus 10 comprise differing mounts. The illustrated $1^{st}$ mount 16 and $2^{nd}$ mount 18 are conventional hydraulic cylinder mounts having an orifice 24 for hardware passage.

Figure 4:
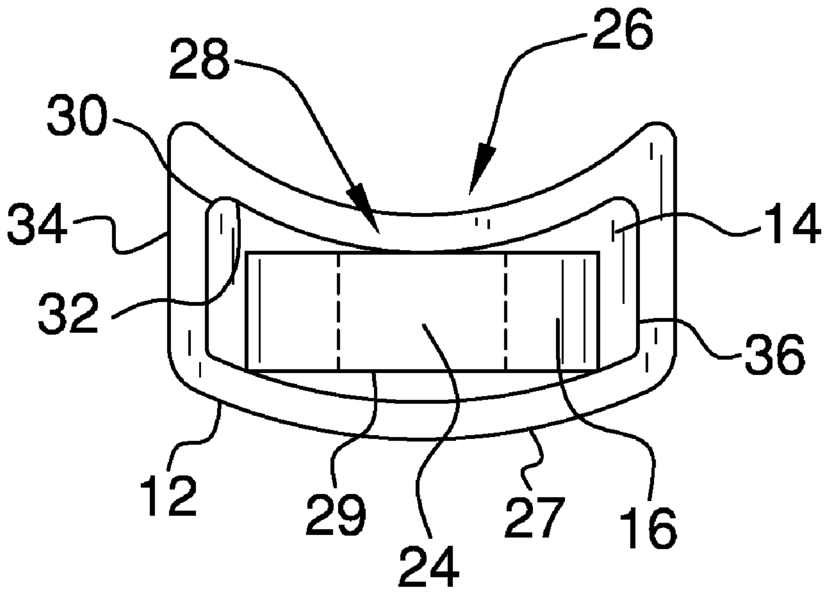
FIG. 4 is a top plan view.
Figure 5:
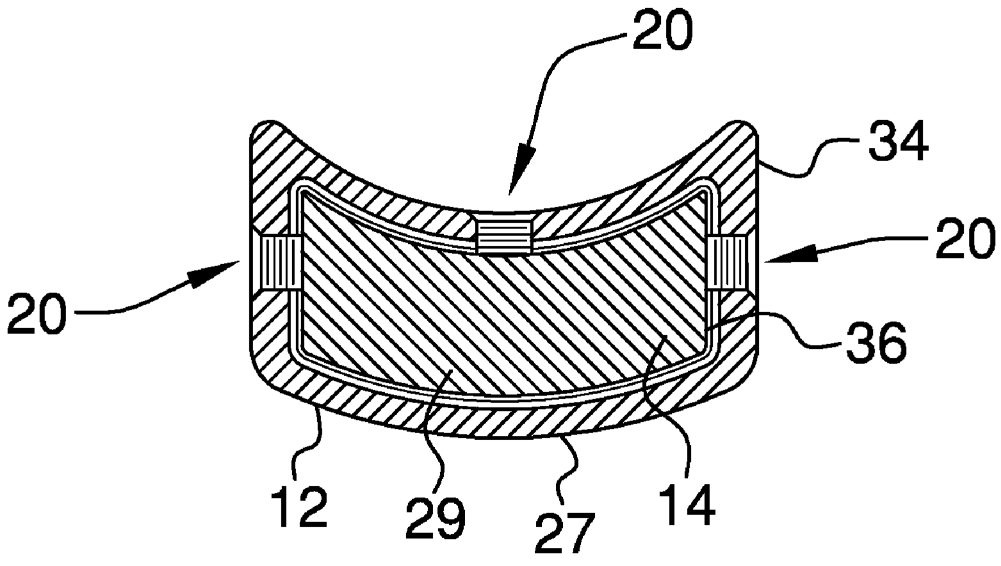
FIG. 5 is a top cross sectional view.
Figure 6:
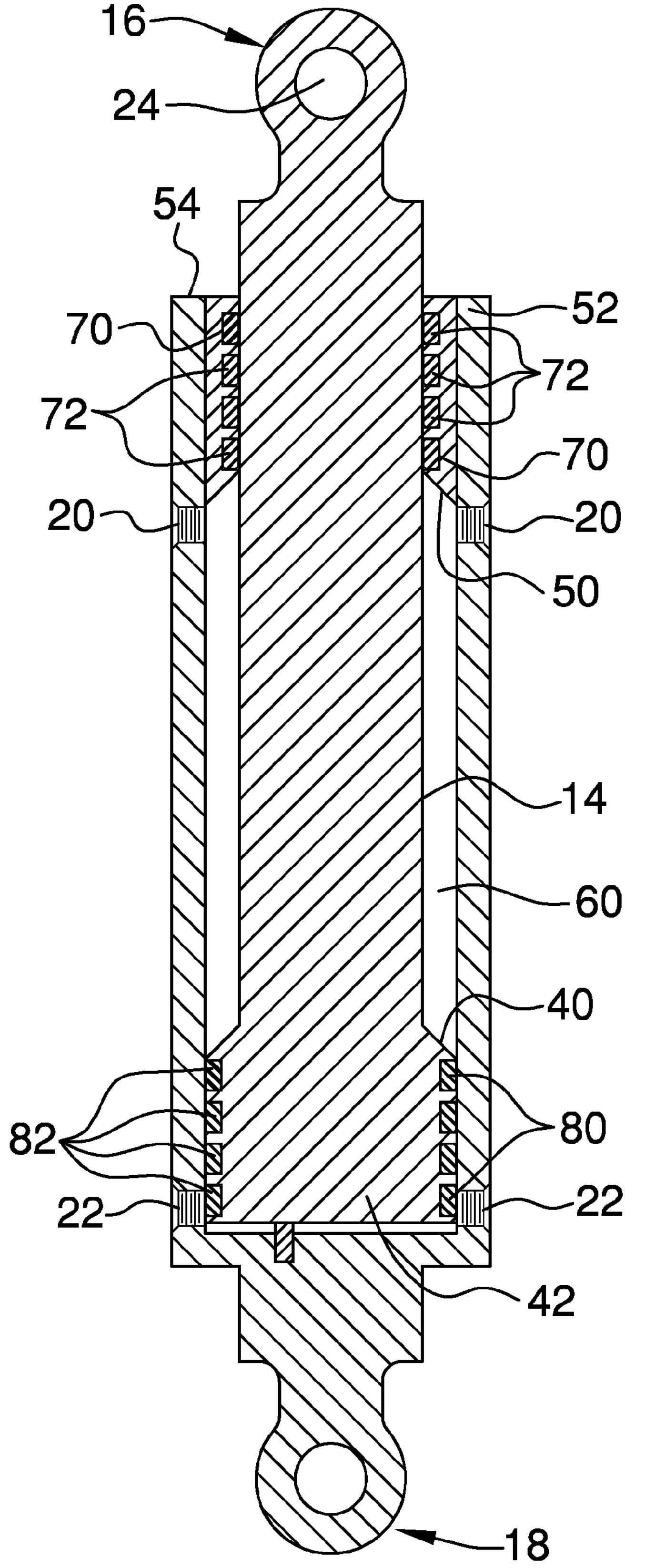
FIG. 6 is a cross sectional view.

Referring to FIGS. 4-6, the apparatus 10 further comprises a crescent shaped case 12 having a top, a bottom, a front, a back, and a length. The front of the case 12 comprises a case convex 27. The back of the case 12 comprises a case concavity 26. The case convex 27 and the case concavity 26 are each joined by two spaced apart parallel flat case sides 34. A case radius 32 is disposed between each case side 34 and the case concavity 26. The interior of the case 12 comprises a well 60. The hydraulic fluid well 60 terminates at the case angle 50 which terminates in the case end piece 52 adjacent to the case 12 top. The case end piece 52 is topped by the case lip 54 which ensures against foreign material invasion. The plurality of spaced apart case ring grooves 70 is disposed in the case end piece 52. A case ring 72 is disposed within each case ring groove 70. Each illustrated case ring 72 represents either a sealing ring 72 or a seal.

Various embodiments call for variations of the number of seals versus the number of rings 72. A case ring 72 may also serve dual purpose of ring 72 and seal. The case ring grooves 70 and case rings 72 are squared for optimal fluid seal. The $2^{nd}$ mount 18 is disposed on the bottom of the case 12. The plurality of upper hydraulic ports 20 is disposed within the case 12. The upper ports 20 are disposed adjacent to and below the case angle 50. Ideally, one upper port 20 is disposed in each case side 34. An additional upper port 20 is disposed in the case concavity 26. The plurality of lower hydraulic ports 22 is disposed proximal to the case 12 bottom. While the piston 14 is illustrated in a fully bottomed position, the in-use application would find the piston flare above the lower ports 22. In such position, hydraulic fluid entering the lower ports 22 would propel the piston 14 upwardly. Hydraulic fluid entering the upper ports 20 would propel the piston 14 downwardly within the well 60. The crescent shaped piston 14 is therefore slidingly disposed within the case 12. The piston 14 comprises a top, a bottom, and a length therebetween. The piston concavity 28 is disposed at the back of the piston 14. The piston convex 29 is disposed at the front of the piston 14. The pair of parallel spaced apart flat piston sides 36 connect the piston convex 29 and the piston concavity 28. A piston radius 30 is disposed between each piston side 26 and piston concavity 28. The bottom of the piston 14 terminates in the piston flare angle 40 which terminates in the piston flare 42. The plurality of spaced apart piston ring grooves 80 is disposed in the piston flare 42. A piston ring 82 is disposed in each piston ring land 80. The piston ring grooves 80 and piston rings 82 are squared for optimal fluid seal. Each piston radius 30 fits each complimentary case radius 32 for optimal fluid seal and wear characteristics. The conventional first mount 16 is disposed at the piston 14 top.

With respect to the above description then, it is to be realized that the optimum dimensional relationships for the parts of the hydraulic cylinder apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the hydraulic cylinder apparatus.

Directional terms such as “front”, “back”, “in”, “out”, “downward”, “upper”, “lower”, and the like may have been used in the description. These terms are applicable to the embodiments shown and described in conjunction with the drawings. These terms are merely used for the purpose of description in connection with the drawings and do not necessarily apply to the position in which the hydraulic cylinder apparatus may be used.

Therefore, the foregoing is considered as illustrative only of the principles of the hydraulic cylinder apparatus. Further, since numerous modifications and changes will readily occur to those skilled in the art, it is not desired to limit the hydraulic cylinder apparatus to the exact construction and operation shown and described, and accordingly, all suitable modifications and equivalents may be resorted to, falling within the scope of the hydraulic cylinder apparatus.

What is claimed is:

1. A hydraulic cylinder apparatus, comprising:

a crescent shaped case having a top, a bottom, a front, a back, and a length, the front of the case comprising a case convex, the back of the case comprising a case concavity, the case convex and the case concavity joined by two spaced apart parallel flat case sides, a case radius between each case side and the case concavity, an interior of the case comprising a well, the well terminating at a case angle terminating in a case end piece at the case top, the case end piece topped by a case lip;

a plurality of spaced apart case ring grooves disposed in the case end piece;

a case ring disposed within each case ring groove;

a mount on the bottom of the case;

a plurality of upper hydraulic ports within the case, the upper ports disposed adjacent to and below the case angle;

a plurality of lower hydraulic ports disposed proximal to the case bottom;

a crescent shaped piston slidingly disposed within the case, the piston comprising a piston top, piston bottom, and a length therebetween, a piston concavity at a back and a piston convex at a front of the piston, a pair of parallel spaced apart flat piston sides connecting the piston convex and the piston concavity, a piston radius between each piston side and piston concavity, the bottom of the piston terminating in a piston flare angle terminating in a piston flare;

a plurality of spaced apart piston ring grooves disposed in the piston flare;

a piston ring disposed in each piston ring groove;

a mount disposed at the piston top.

2. The apparatus according to claim 1 wherein one of the upper hydraulic ports is further disposed in the case concavity.

3. The apparatus according to claim 2 wherein one of the lower hydraulic ports is further disposed in the case concavity.

4. The apparatus according to claim 1 wherein one of the lower hydraulic ports is further disposed in the case concavity.

* * * * *